Patented July 10, 1951

2,559,638

UNITED STATES PATENT OFFICE 2,559,638

PRODUCTION OF TITANIUM DIOXIDE

Ignace Joseph Krchma, Wilmington, and Holger Heinrich Schaumann, Newark, Del., assignors to E. I. du Pont de Nemours & Company, Wilmington, Del., a corporation of Delaware No Drawing. Application July 25, 1947, Serial No. 763,738

9 Claims. (Cl. 23—202)

This invention relates to the production of improved titanium dioxide pigments, and more particularly to novel methods for producing such pigments through the vapor phase oxidation of certain metal halide mixtures under controlled conditions of reaction.

In the co-pending application of Holger H. Schaumann, Serial No. 653,428, filed March 9, 1946, (issued as U. S. Patent 2,488,439, dated November 15, 1949), highly-useful methods are disclosed for obtaining pigment-quality titanium dioxide through the vapor phase oxidation of titanium tetrachloride. In accordance with that application, an anatase or rutile pigment is produced by conducting the gas phase decomposition of titanium tetrachloride in the presence of small, regulated quantities (preferably from 0.1% to 5% by volume) of added water vapor to continuously form and effect the reaction in the presence of a $TiO_2$ nucleating agent adapted to promote and insure production of a high-quality, uniform type of $TiO_2$ pigment.

Although its essential pigment properties are satisfactory, the $TiO_2$ product from said Schaumann oxidation process is acidic in character, having a pH of 4-5. This acidity which is very undesirable is due to its free halogen (chlorine) or halide content and renders the product non-adaptable for immediate pigment use. This halogen content cannot be completely removed except upon resort to an expensive, time-consuming wet treatment with an alkaline neutralizing solution, such as ammonium hydroxide, sodium carbonate, sodium hydroxide, etc., and after such neutralization the pigment must be dried, calcined and mechanically ground or pulverized to eliminate aggregates present and insure recovery of a product exhibiting satisfactory fineness. Certain disadvantages arise from this neutralizing after-treatment, including the tendency of the pigment to objectionably discolor or yellow when employed in high temperature or baked refrigerator types of paints and enamels, and the failure of the required grinding treatment to reproduce the fine particle size characterizing the original precipitate. Hence, the final pigment has lacked discoloration resistance in high temperature coating compositions and is necessarily coarser in texture than desired.

It has now been found that if the titanium tetrachloride oxidation process contemplated in the disclosure of said Schaumann application is effected in the presence of a relatively small amount of aluminum chloride which also forms a white, water-insoluble oxide during the oxidation, the above neutralizing treatment need not be resorted to, and that residual halogen present in the recovered $TiO_2$ precipitate can be effectively eliminated upon direct calcination in the dry state and at a relatively mild, say 600° C., temperature. It has also been found that the product from such mild calcination will advantageously comprise a substantially neutral (pH 6.5-7.5) $TiO_2$ product and will be softer in texture and more readily ground to superfineness to yield a particle size commensurate with that of the original $TiO_2$ precipitate. In addition, the pigment will be improved in hiding power, tinting strength, color, and other essential pigment qualities. When employed in coating compositions, it will improve the film color of such compositions; will decrease the baking discoloration heretofore encountered in oleoresinous and synthetic resin vehicles; will improve resistance to yellowing on exposure in architectural and refrigerator enamels; and will desirably increase pigment chalking and fading resistance upon employment in exterior coating compositions or finishes, such as paints and automotive enamels.

These and other advantageous results and benefits are attained in this invention which comprises obtaining an improved type of pigment-quality titanium dioxide, in either the rutile or anatase crystalline form by decomposing in the vapor phase titanium tetrachloride and a small amount of aluminum chloride under controlled oxidation conditions and in the presence of small, regulated quantities of water vapor.

More specifically and preferably, the invention comprises producing pigment-quality rutile by reacting in the vapor phase, at elevated temperatures and over a controlled time period, a mixture of relatively pure titanium tetrachloride and an amount of aluminum chloride equivalent to from .3% to 3% $Al_2O_3$, based on the amount of titanium pigment being produced, with an oxygen-containing gas in the presence of from 0.1% to 5% by volume (based on the total volume of gases present) of water vapor, and thereafter subjecting the recovered pigment to a mild calcination followed by milling treatment.

In practically adapting the invention, vaporized, anhydrous titanium tetrachloride containing a small amount (equivalent to from .1% to 10% as the oxide) of vaporized aluminum chloride, capable of yielding white, insoluble aluminum oxide, is continuously and separately introduced into a suitable reaction vessel or zone maintained at a substantially constant temperature ranging, say, from 900-1200° C., and wherein the mixture becomes thoroughly commingled and substantially completely reacted with an oxygen-containing gas, such as air, which has been enriched with from, say, 0.1% to 5%, of water vapor. As a result of such commingling, substantially complete oxidation of the halide mixture takes place with formation and production of a $TiO_2$ product containing as an essential ingredient a small amount (from, say, .1% to 10%, based on the $TiO_2$) of aluminum oxide from the diluting or modifying volatile halide reacted along with the TiCl4. Prior to such introduction, each reactant may, if desired, be preheated to a temperature sufficient to insure its reaction when brought together in the reaction zone with the other reactants and within the temperature range mentioned. In effecting such mixing and reaction, any conventional, corrosion-resistant type of mixing and reaction vessel can be employed herein, provided it is of a design, construction and dimension that a continuous flow of reactants and products of reaction within and through the oxidation chamber will be afforded and such control can be exercised over the velocities, mixing rates, temperatures, and reactant retention times employed that, on the average, said reactants will remain in said zone for but a limited, short period of time; that is, long enough to enable a substantially complete reaction to take place but less than the time which would result in the occurrence of undesired pigment particle size growth. Employing the range of temperature indicated, reactant retention times ranging from .1–1 second are preferred for use since complete conversion of the mixed halides to their corresponding oxides occurs within such time. Preferably also, and to obtain optimum results hereunder, use of the highly efficient slot-jet type of apparatus disclosed in the copending application of Oswin Burr Willcox, Ser. No. 763,286, filed July 24, 1947, is resorted to herein. This apparatus comprises an elongated mixing and reaction vessel of relatively restricted cross-section into which the involved reactants are separately fed at controlled velocities and their admixture and reaction is effected therein, by continuously charging one reactant into the other while it is in a relatively thin, sheeted stream flowing from the periphery of said vessel in a direction angular or radially to the axis or direction of flow of such other reactant through said vessel. The gaseous pigment suspension (at a temperature of about 1150° C.) which issues from the oxidation zone of the reactor is subjected to substantially immediate cooling in order to reduce its temperature to below 600° C. and prevent undesired growth of $TiO_2$ pigment particles which would otherwise objectionably occur by reason of the cementation or sintering of loosely-bound pigment aggregates present. The desired quenching can be effected by resorting to any conventional type of effective cooling operation, such as by recirculating cooled product gases from the system and directly commingling them with the highly-heated pigment suspension. Preferably, the quick quenching operation is effected by dispersing or entraining in the hot gaseous titanium-containing suspension a sufficient charge or blast of relatively cold, finely-divided particles of an inert, solid material, such as silica, which is non-reactive chemically toward the suspension, and as contemplated in the copending application of I. J. Krchma, Ser. No. 751,709, filed June 2, 1947. The quantity of recirculated, cooled product gases or cold solids material thus employed should, as already noted, be sufficient to drop the temperature of the hot suspension to below about 600° C. and within less than 5 and not to exceed 10 seconds' time. The $TiO_2$ pigment product can be recovered from the cooled reaction products by conventional separatory treatments, including cyclonic or electrostatic separating media, filtration through porous media, or the like.

Following recovery, the modified, composite type $TiO_2$ pigment product is subjected, in the dry state, to a relatively mild calcination treatment until desired chlorine removal becomes effected. By "mild" is meant a calcination temperature below that at which the primary $TiO_2$ particles grow by sintering. Such temperature should not exceed 800° C. and usually ranges from 500–700° C., with a temperature of about 600° C. being preferred for use. Thereafter, the chlorine-freed product is subjected to milling, grinding or disintegration treatment to remove aggregates and can be finished in conventional milling means, such as a hammer or roller type mill or a disintegrator to obtain the desired small-particle-size pigment. In its finished state, the pigment will be uniformly small in size, its average particle size radius ranging from .05 to .5 micron, and preferably from .1 to .25 micron. Being substantially neutral (pH 6.5–7.5), uniformly small in particle size, soft-textured, and of inherently high tinting strength, color, opacity and other essential pigment properties, it will be generally and readily adapted for use in all types of pigment applications, such as paints, enamels, finishes, or other types of coating compositions, as well as a delusterant for rayon, nylon, or other artificial fibers or silks or as an essential pigmenting ingredient in printing inks, rubber, plastics, and other uses. Because of its high resistance toward discoloration and yellowing, it is outstandingly and particularly useful in high temperature or baked refrigerator types of paints and enamels.

To a clearer understanding of the invention, the following examples are given. These are merely illustrative and not intended to be in limitation of the underlying scope and principles of the invention:

*Example I*

A vaporized mixture consisting of 98% by volume of titanium tetrachloride and 2% by volume of aluminum chloride, preheated to 920° C. in a corrosion-resistant preheater, was continuously admitted, at a rate equivalent to 140 parts by weight per hour, to the upper portion of a vertical, corrosion-resistant reaction chamber maintained at a temperature of 1170° C. Simultaneously therewith, humidified air, similarly preheated to about 900° C. and containing sufficient added water vapor to provide a .95% $H_2O$ content by volume, was continuously admitted to said chamber, at a rate equivalent to 26 parts by weight of $O_2$ per hour, through a separate inlet adjacent said mixed metal chloride inlet. The separate inlets through which said reactants were so admitted were so arranged with respect to each other that the gas streams entering the chamber converged immediately upon their introduction and the reactants became rapidly and substantially instantaneously mixed together in the upper part thereof. The flow rates used provided an average retention time of reactant gases and products within the reaction zone of about .5 of a second. The gaseous suspension of composite $TiO_2$ which resultantly formed within such zone issued from the bottom thereof at a temperature of approximately 1130° C. and upon its emergence therefrom was subjected to quick quenching to drop its temperature to 300° C. in less than 2 seconds by introducing sufficient cold chlorine gas therein. The composite titanium dioxide pigment product was then separated and recovered from the reaction products in filter containers, following which it was subjected to calcination, in the dry state, at a temperature of 600° C. for a period of 90 minutes. It was then dry ground in a hammer mill to effect aggregate removal.

The above process was operated continuously with substantially 100% conversion of the titanium tetrachloride and aluminum chloride taking place. The pigment product had a pH value of 7.0 and its titanium dioxide component on X-ray analysis was found to consist entirely of rutile. It was of excellent soft texture, was uniformly small in particle size (had an average particle size radius of .165 micron) and its tinting strength and color values were, respectively, 192 and 20:2Y. Its baking discoloration value was very high, being at a value of 20, and its resistance to yellowing in a typical refrigerator enamel was excellent.

For comparative purposes, this example was duplicated in all respects, except that in one instance (pigment A below) aluminum chloride was not present as a reactant; while in another instance (pigment B below), water vapor was not present during the oxidation. From these tests the following results were obtained:

| Pigment | Baking Discoloration | Yellowing Resistance | pH | Rutile | Tinting Strength | Color | Particle Size Radius |
|---|---|---|---|---|---|---|---|
|  |  |  |  | Per cent |  |  | Microns |
| A | 8 (poor) | poor | 4.5 | 95 | 180 | 16:2Y | .178 |
| B | 8 (poor) | do | 4.7 | 10 | 75 | 9:4Y | .640 |

(The pigment values given above and throughout this specification were determined in accordance with the methods outlined or referred to in U. S. Patents 2,253,551 and 2,046,054. The baking discoloration values given were determined by incorporating a pigment prepared in accordance with this invention in an automotive type of finish formulated largely with modified alkyd resins of the oxidizing type or combinations thereof with oil-modified phenol aldehyde resins, vinyl resins, etc., and then applying the resulting formulation as a coating to a panel and baking the coated panel at 180° C. for 1¼ hours. Any changes in color due to the action of heat are compared with those of a similar coating compounded with a standard pigment of high quality which has been similarly applied to a panel and baked. This control panel is arbitrarily given a number rating of 18. The test paint or coating is penalized 1 point for the least visually detectable discoloration as compared with the control. Conversely, if the control paint is observed to have discolored more than the one under test, the latter is given a rating correspondingly higher than 18. The best grades of paint pigments generally have a BD rating of 14 to 20. The yellowing resistance properties of a pigment can be readily ascertained through visual inspection and comparison of a paint or enamel-coated panel containing such pigment and another panel coated with the same formulation but containing a high-grade commercial $TiO_2$ pigment. Such comparison is made after the exposure of the panels for a definite period of time to direct weathering or simulated atmospheric conditions in an exterior type of coating composition or after exposure in an interior type of finish subjected to diffused or indirect lighting.)

*Example II*

Aluminum chloride vapor at a temperature of 860° C. was added to a stream of vaporized titanium tetrachloride at 920° C. to form a vaporized mixture consisting of 97.7% by volume of $TiCl_4$ and 2.3% by volume of $AlCl_3$. This vaporous mixture was continuously fed to a slot jet type of mixing and reaction vessel, constructed of silica, and of a type disclosed in the co-pending application of Oswin Burr Willcox, Ser. No. 763,286, filed July 24, 1947. This device comprised a central, vertical tubular element having a 2" internal diameter in which, intermediate its length, was provided a continuous, transverse peripheral slot opening $\frac{1}{32}$" in width. The area below said slot was 20" in length, comprised the reaction zone portion of said device. The $TiCl_4$—$AlCl_3$ vaporous mixture was continuously fed through said slot opening in the form of a sheeted stream at a rate of 30.4 mols per hour, while simultaneously air, preheated to 930° C. and to which 0.5% by volume of $H_2O$ had previously been added, was separately and continuously fed into the device through a separate inlet of the tubular element remote from the slot inlet to flow downwardly therethrough past said peripheral slot and into the reacting zone. The vaporous chloride mixture, flowing as a thin, sheeted stream from the outer periphery of the tubular element and in a direction radial to the direction of flow of the oxidizing gas, became quickly mixed and reacted with the latter at a point substantially immediately adjacent and below the peripheral slot inlet. The reaction zone was maintained at a temperature of 1050° C. and the reactants remained within said zone for a period of only .21 second. The resulting gaseous suspension of composite $TiO_2$ pigment was discharged at a temperature of approximately 1030° C. from the reaction zone and lower extremity of the tubular element, and was quickly quenched to drop its temperature to 250° C. in less than 2 seconds by introducing therein sufficient cold chlorine gas. The composite pigment product was then separated and recovered in filter containers, calcined in the dry state at a temperature of 600° C. for 90 minutes, and was then ground in a conventional Raymond mill.

The recovered composite $TiO_2$ pigment was soft and fluffy, and extremely fine in particle size. It represented a 100% yield of the theoretical. Its pH value was 7.1 and, on analysis, it was found to contain 97.71% $TiO_2$ (all rutile) and 1.6% $Al_2O_3$. Its tinting strength was 194; its color 19:2Y; and its average particle size radius was .160 micron.

Although it is essential, in producing a pigment-quality $TiO_2$ product under the invention, that the temperatures, concentrations, and retention times used shall be controlled and correlated, the reactants, concentrations, volumes, ratios, temperatures, velocities, and times which have been mentioned can be suitably varied. Thus, while titanium tetrachloride and aluminum chloride comprise essential reactants in the process, other volatilizable metal halides, particularly chlorides which yield white, insoluble oxides during the co-oxidation, such as the chlorides of silicon, zirconium, antimony, zinc and tin, can be employed in conjunction therewith, and in amounts to accord with the results desired and the ultimate type of pigment product sought.

Such additional metal halides may be used individually with the titanium tetrachloride and aluminum chloride or mixtures thereof can be employed, depending upon the type and use of the pigment being produced. The amount of additional halide employed is usually relatively small, e. g., ranging from 0.1% to 10% by weight, based on the weight of the titanium tetrachloride and aluminum chloride.

Similarly, the amount of $AlCl_3$ employed in the invention is relatively small or minor and need only range from, say, 0.1% to 10% by weight, based on the $TiCl_4$. When amounts under about 5% and ranging from, say, about .5% to 4% are used, outstandingly beneficial effects have been found to result, and hence such latter amounts are preferred for use in obtaining optimum benefits hereunder.

The aluminum chloride may be mixed with the titanium tetrachloride either in liquid or vaporized state and then heated to a suitable reaction temperature prior to introducing the reactants into the reaction vessel. Alternatively, these reactants may be added separately to the reaction zone after their desired preheating.

As disclosed in the aforementioned Schaumann application, air, suitably humidified by $H_2O$ addition, comprises a preferred type of oxygen-containing gas for use in the invention. However, other types as well as amounts of oxidizing gases containing free oxygen ($O_2$), and similarly preferably moisture-enriched prior to use, can be employed herein, as can mixtures of such gases. Other useful types of gases include oxygen, oxygen-enriched air, or mixtures of oxygen or air with various inert types (nitrogen, etc.) of gases.

Generally, it is preferred to operate the process with amounts of oxidizing gas sufficient to provide about 10% excess oxygen over the theoretical so as to obtain a product gas containing about 30% $Cl_2$ by volume, when air is used as the source of oxygen, and 90–95% $Cl_2$ when gaseous oxygen is employed, with but small or minor amounts of $O_2$ and HCl. The use of oxygen-enriched air will produce chlorine concentrations intermediate between 30 and 90% $Cl_2$ gas in the oxidation products. However, the invention is not limited to this, but can be operated using either excess or deficient concentrations of the oxidizing or titanium tetrachloride reactant. In event of excess chloride use, the latter can be separated from the oxidation products and reused in the system.

The amount of water vapor present in the oxidizing medium, while preferably ranging from .1–3%, may vary from, say, .05% to 5%, but should not exceed 10%, these percentage amounts being based on the total volume of gaseous reactants being fed to the reaction zone. While the required concentration of water vapor is preferably introduced into the reaction zone via and as a component part of the oxidizing agent, other methods for insuring the presence of a sufficient quantity of $H_2O$ during the contemplated vapor phase oxidation reaction can be resorted to. It being essential and critical to the invention that the water vapor be present in controlled quantity, any method insuring the presence of such required quantity, or which will lower the amount present if too high, is contemplated as useful herein. Thus, the water vapor can be continuously added, either directly and independently to the reaction zone itself, or as a component of the oxidizing medium being employed and introduced into such zone. Alternatively, it can be introduced with either or both chloride reactants, or by first mixing part or all of the latter reactants while in gaseous state and then suitably incorporating the desired quantity of water vapor into them prior to charging the mixture into the reaction zone. Other methods for insuring the presence of the requisite amount of water vapor during the reaction, more particularly disclosed in said Schaumann application, can also be employed, as can the process of forming the water vapor in situ of the reactants and through free hydrogen presence in the reaction zone disclosed in the co-pending application of H. H. Schaumann, Ser. No. 713,382, filed November 30, 1946 and issued as U. S. Patent 2,488,440 dated November 15, 1949.

While reaction zone temperatures ranging from 900–1200° C. are preferred for use, temperatures ranging from 800° C. to 1350° C. are also employable. These temperatures can be readily obtained in a large-scale, commercial type of operation, by either separately preheating each or all reactants to a temperature adequate to insure on their admixture and reaction temperatures of the order indicated. They can be maintained either by means of the heat generated from the oxidation reaction or by externally heating the reaction zone or vessel, whichever is preferred. The temperatures specified comprise those measured by a thermocouple extending through the walls of the reaction vessel and into the reacting gases.

The reactants used can be separately preheated by subjecting each to an equivalent heating temperature, or, if desired, the oxodizing gas may be preheated to a temperature above or below that to which the titanium tetrachloride and other metal halide is subjected, whichever is preferred. Any conventional type equipment can be used in the preheating operation, including any suitable type of electrical resistance apparatus or devices which will pass the reactants in direct or indirect heat exchange relationship with a heat-imparting medium. A useful type for the purpose comprises one in which the reactants pass over heat transfer surfaces heated directly by combustion of fuels or indirectly by circulation of a suitable heat transfer medium.

Normally, the oxidation reaction is effected under atmospheric pressures, but, if desired, it may be conducted under super- or subatmospheric pressures. Similarly, any type or size of reaction vessel conforming to the scale of operation intended can be used, with equipment of such design and dimension as will permit a continuous flow of reactants through the reaction vessel, especially the oxidation chamber, being preferred for use to insure a continuous, as distinguished from a discontinuous or batch, type of operation being effected. While a continuous process is preferred, a batch or semicontinuous operation can also be resorted to.

The time of retention of the reactants within the reaction zone is also quite important and critical in the production of pigment-quality $TiO_2$. Generally, the retention time of all reactants within the mixing and reaction zone must not exceed about 5 seconds nor be less than about .01 of a second, with a preferred time, to insure recovery of an optimum quality pigment, ranging from .1 to 1 second.

As contemplated in said Schaumann application, both anatase and rutile $TiO_2$ pigments can be produced in this invention. In producing rutile of optimum pigment qualities, the oxidation reaction should be effected under such a combination of conditions that there will exist:

(a) A minimum moisture concentration in the reacting gases;

(b) A minimum preheating temperature for the reactants will be used and a thorough, rapid admixture of such reactants will be effected;

(c) A minimum retention time of reactants and products in the oxidation chamber will prevail, sufficient only to effect substantially complete conversion of the $TiCl_4$ to $TiO_2$ and growth of the $TiO_2$ pigment particles to the desired size; and (d) A quick cooling or quenching of the products from the oxidation reaction after formation of the desired $TiO_2$ particle size will be had so as to prevent overgrowth of the pigment particles.

These variables are interdependent and optimum values, within the limits specified for moisture content in the reacting gases, preheating and reaction zone temperatures and retention time in the oxidation chamber must be predetermined for a particular apparatus to obtain therefrom the desired particle size rutile pigment. The preferred relationship between these critical variables is dependent upon such factors as manner and speed of mixing of the reactants, size and shape of the oxidation chamber, etc., as well as upon the particle size desired in the pigment $TiO_2$.

The preheating temperature to which the reactants are subjected has an important bearing upon the ultimate type, crystallinity, and character of the $TiO_2$ pigment. In anatase production, it is usually desirable that lower preheating temperatures with resulting lower reaction chamber temperatures be resorted to than is necessary in the production of rutile. The preferred, most useful temperature used will depend upon such factors as the scale of the involved operation, the size and shape of the reaction chamber, and the rapidity with which gas mixing can be effected. In producing rutile, preheating temperatures adequate to insure a mixed gas temperature of at least 350° C., and preferably above 400° C., are usually required. In anatase production, preheating temperatures sufficient to afford a mixed gas temperature ranging from below 350° C. to not lower than 100° C. are usually adequate. While a preheating temperature of at least 350° C. is suggested for rutile production, it will be found that as the size of a given operation increases, the amount or degree of preheating temperature required will decrease somewhat. Hence, temperatures below said 350° C. and to as low as 250° C. may be employed in some instances. When preheating temperatures below 400° C. are employed, the pigment product may contain appreciable quantities of combined chlorine (oxychlorides). These are readily decomposed upon subjection of the product to the mild calcination treatment herein contemplated.

The titanium tetrachloride and aluminum chloride reactants used preferably comprise high-purity materials free of contaminating impurities, such as those of vanadium, iron, copper, etc., and which will thus insure production of a product exhibiting exceptionally high pigment whiteness and brightness characteristics. The $TiCl_4$ can be obtained, for instance, by chlorinating a titaniferous ore, such as ilmenite, and purifying the product through careful fractional distillation. Examples of other useful titanium tetrachloride reactants comprise the pure, anhydrous titanium tetrachloride (freed of copper, vanadium, iron, and other impurities) contemplated in U. S. Patent 2,062,133, or the product resulting from soya bean oil treatment as disclosed in U. S. Patent 2,230,538. Similarly, the aluminum chloride reactant can be prepared through the chlorination of aluminum metal or may comprise the ordinary aluminum chloride of commerce.

The exact manner in which the combination of controlled amounts of water vapor, titanium tetrachloride, and aluminum chloride during the vapor phase oxidation affords production of the improved $TiO_2$ pigment of this invention is not presently clearly understood. It appears, however, that four involved reactions of varying degree of exothermicity must be considered:

(1) $TiCl_4(g) + 2H_2O(g) \rightarrow$
$TiO_2 + 4HCl(g) + 18.4$ K cal
(2) $TiCl_4(g) + O_2(g) \rightarrow TiO_2 + 2Cl_2(g) + 45.6$ K cal
(3) $2AlCl_3(g) + 3H_2O(g) \rightarrow$
$Al_2O_3 + 6HCl(g) + 73.2$ K cal
(4) $2AlCl_3(g) + 1\frac{1}{2}O_2(g) \rightarrow$
$Al_2O_3 + 3Cl_2(g) + 114$ K cal Titanium tetrachloride reacts avidly with water vapor, and it appears that under the controlled conditions which prevail when the reactants are mixed (high concentration $TiCl_4$ and low concentration of $H_2O$) that reaction (1) first forms extremely minute $TiO_2$ crystallites, well dispersed throughout the gaseous mixture. Control over the size, crystalline form, and number of these nucleating particles is effected by the amount of water present and the temperature conditions under which they are permitted to form. Under the prevailing, controlled reaction conditions, a continuous, fresh supply of nucleating particles is provided onto which $TiO_2$ from reaction (2) can precipitate to build up or grow into $TiO_2$ particles of desired pigment dimensions. Since the $AlCl_3$ is present in only minor amounts, and is competing with $TiCl_4$ in relatively high concentration for reaction with $H_2O$ vapor, it is unlikely that significant amounts of alumina are formed by reaction (3), in spite of its higher heat of reaction. The major portion of the $Al_2O_3$ is apparently formed by reaction of $AlCl_3$ with oxygen, since concentrations, temperature, and thermal energy conditions are more favorable for reaction (4) than for reaction (3). Therefore, reaction (4) then proceeds simultaneously with reaction (2) and alumina is deposited continuously with $TiO_2$ on the nucleating particles formed by reaction (1). However, $TiO_2$ and $Al_2O_3$ are dissimilar in crystal structure and the $Al_2O_3$ cannot fit directly into the crystal lattice of $TiO_2$. The simultaneous precipitation from the gas phase of large amounts of $TiO_2$ compared with the quantity of $Al_2O_3$ formed, together with the extremely rapid formation of $Al_2O_3$, suppresses true crystallinity in the $Al_2O_3$. It is believed that under the prescribed conditions, the minor amount of alumina is deposited in amorphous form throughout and on the surface of the $TiO_2$ particles. Quite surprisingly, the benefits imparted to the pigment $TiO_2$ when alumina is introduced in this manner cannot be achieved by separately reacting aluminum chloride in the vapor phase with oxygen or water vapor, or mixtures of the two, and then intimately mixing the $Al_2O_3$ with $TiO_2$ which has been separately prepared. The advantages of the invention are realized only when the simultaneous reactions between $TiCl_4$, $AlCl_3$, oxygen and water vapor under the indicated conditions of concentration, temperature and reaction zone retention times are effected.

We claim as our invention:

1. A process for obtaining pigmentary titanium dioxide which comprises reacting in the vapor phase, and at temperatures ranging from 800–1350° C., titanium tetrachloride and a small amount of aluminum chloride with an oxygen-containing gas, effecting said reaction over a time period ranging from .01 to 5 seconds and in the presence of from .05 to 10% by volume, based on the total volume of gases being reacted, of water vapor, and thereafter recovering the $TiO_2$ product from the resulting reaction products.

2. A process for producing pigmentary titanium dioxide which comprises reacting in the vapor phase and at a temperature of at least 800° C. titanium tetrachloride together with from 0.1% to 10%, by weight, based on said tetrachloride, of aluminum chloride with an oxygen-containing gas, effecting said reaction over a time period ranging from .01 to 5 seconds and in the presence of from .05% to 10% by volume, based on the total number of gases being reacted, of water vapor, and thereafter recovering the $TiO_2$ product from the resulting reaction products.

3. A process for producing pigmentary titanium dioxide which comprises reacting titanium tetrachloride, together with from 0.1% to 10%, by weight, based on said tetrachloride, of aluminum chloride, with an oxygen-containing gas, effecting said reaction over a time period ranging from .01 to 5 seconds in the vapor phase at temperatures ranging from 800–1350° C., and in the presence of regulated quantities of water vapor ranging from .05% to 10% by volume, based on the total volume of gases being reacted, and then recovering the $TiO_2$ pigment from the resulting reaction products.

4. A process for producing pigment-quality titanium dioxide, comprising reacting in the vapor phase titanium tetrachloride, together with from .1 to 10% of aluminum chloride, calculated as the oxide, with an oxygen-containing gas, at temperatures ranging from 900–1200° C. and in the presence of from .05% to 10% by volume of water vapor, based on the total volume of gases being reacted, effecting said reaction over a reaction zone retention time period ranging from .01 to 5 seconds, and then subjecting the resulting $TiO_2$ product to a mild calcination treatment.

5. A process for producing pigment-quality rutile which comprises reacting in the vapor phase and at temperatures ranging from 900–1200° C., titanium tetrachloride and an amount of aluminum chloride equivalent to from .1% to 10%, calculated as the oxide, with an oxygen-containing gas, effecting said reaction over a time period of from .01 to not to exceed 5 seconds and in the presence of an amount of water vapor ranging from .1% to 5% by volume, based on the total volume of gases being reacted, calcining the recovered $TiO_2$ product at a temperature ranging from 500–800° C., and subjecting the calcined product to mechanical milling treatment.

6. A process for producing a rutile $TiO_2$ product having a substantially neutral pH value, which comprises reacting, in the vapor phase and at temperatures ranging from 900–1200° C., a mixture of preheated titanium tetrachloride and an amount of aluminum chloride equivalent to from .3% to 3% $Al_2O_3$, based on the amount of titanium pigment being produced, with air containing an amount of water vapor ranging from .1% to 5% by volume, based on the total volume of gases being reacted, effecting said reaction over a time period ranging from .01 to not to exceed 5 seconds, and then calcining the recovered $TiO_2$ product at a temperature of from 500–700° C.

7. A process for producing pigment-quality rutile exhibiting improved baking discoloration and yellowing resistance properties in coating compositions, comprising reacting in the vapor phase, and at temperatures ranging from 900–1200° C., titanium tetrachloride admixed with an amount of aluminum chloride equivalent to from .1% to 10%, calculated as the oxide, with air containing from .1% to 5% of water vapor by volume, based on the total volume of gaseous reactants, prior to said reaction separately preheating the chloride mixture and air to a temperature of at least 350° C., effecting said reaction over a time period ranging from .01 to 5 seconds, quickly quenching the resulting reaction products to a temperature below 600° C., thereafter calcining the cooled product in the dry state at temperatures ranging from 500–700° C., and then mechanically milling and recovering the finished product.

8. A process for producing pigmentary $TiO_2$ which comprises reacting in the vapor phase and at temperatures ranging from about 900 to 1200° C., titanium tetrachloride and an amount of aluminum chloride equivalent to from .3% to 3%, calculated as the oxide, with an oxygen-containing gas, effecting said reaction in the presence of an amount of water vapor ranging from .1% to 5% by volume, based on the total volume of gases being reacted, and in a reaction zone in which the reactants remain for a time period of from .1 to 1 second, recovering the resulting $TiO_2$ pigment from the reaction products, and subjecting it to calcination at a temperature ranging from 500 to 700° C.

9. A process for producing pigmentary $TiO_2$ which comprises reacting in the vapor phase and at temperatures ranging from 900 to 1200° C., titanium tetrachloride and an amount of aluminum chloride equivalent to from .3% to 3%, calculated as the oxide, with an oxygen containing gas, effecting said reaction in the presence of an amount of water vapor ranging from .1% to 5% by volume, based on the total volume of gases being reacted, and in a reaction zone in which the reactants remain for a time period ranging from .1 to 1 second, quickly removing the reaction products from said reaction zone and thereupon cooling them to below 600° C. within from 1 to not to exceed 10 seconds, and then subjecting the recovered $TiO_2$ product to calcination at temperatures ranging from 500 to 700° C.

IGNACE JOSEPH KRCHMA.
HOLGER HEINRICH SCHAUMANN.

REFERENCES CITED

The following references are of record in the file of this patent:

UNITED STATES PATENTS

| Number | Name | Date |
| --- | --- | --- |
| 1,967,235 | Ferkel | July 24, 1934 |
| 2,347,496 | Muskat et al. | Apr. 25, 1944 |
| 2,394,633 | Pechukas et al. | Nov. 24, 1946 |

FOREIGN PATENTS

| Number | Country | Date |
| --- | --- | --- |
| 541,343 | Great Britain | Nov. 24, 1941 |